United States Patent
Demos

(10) Patent No.: US 7,769,239 B2
(45) Date of Patent: Aug. 3, 2010

(54) EFFICIENT BIT-EXACT LOSSLESS IMAGE CODING RESIDUAL SYSTEM

(76) Inventor: Gary Demos, 10720 Hepburn Cir., Culver City, CA (US) 90232

( * ) Notice: Subject to any disclaimer, the term of this patent is extended or adjusted under 35 U.S.C. 154(b) by 876 days.

(21) Appl. No.: 11/651,744

(22) Filed: Jan. 10, 2007

(65) Prior Publication Data
US 2007/0160305 A1    Jul. 12, 2007

Related U.S. Application Data

(60) Provisional application No. 60/758,490, filed on Jan. 12, 2006.

(51) Int. Cl.
*G06K 9/00* (2006.01)
*G06K 9/36* (2006.01)
*G06K 9/46* (2006.01)

(52) U.S. Cl. .................. 382/244; 382/232; 382/233; 382/166

(58) Field of Classification Search ............ 382/232, 382/233, 244, 166
See application file for complete search history.

(56) References Cited

U.S. PATENT DOCUMENTS

| | | | |
|---|---|---|---|
| 5,812,700 A * | 9/1998 | Fang et al. | 382/239 |
| 6,037,982 A * | 3/2000 | Coelho | 348/393.1 |
| 6,542,631 B1 * | 4/2003 | Ishikawa | 382/162 |
| 6,750,791 B1 | 6/2004 | Liu | |
| 2003/0198381 A1 * | 10/2003 | Tanaka et al. | 382/166 |

FOREIGN PATENT DOCUMENTS

WO    WO 2004/080080 A1    9/2004

OTHER PUBLICATIONS

J. Reichel, et al. "Integer Wavelet Transform for Embedded Lossy to Lossless Image Compression", IEEE Trans. on Image Processing, vol. 10, No. 3, Mar. 2001.*
International Search Report for Application No. PCT/US2007/000625 dated Oct. 23, 2008, 6 pages.
Discrete Applied Mathematics, "Right invariant metrics and measures of presortedness", Vladimir Estivill-Castro, vol. 42, No. 1, Feb. 26, 1993, pp. 1-16.
Data Compression: The Complete Reference, "3. Dictionary Methods", Salomon D, 1998, pp. 101-162.

* cited by examiner

*Primary Examiner*—Samir A. Ahmed
*Assistant Examiner*—Li Liu
(74) *Attorney, Agent, or Firm*—Pillsbury Winthrop Shaw Pittman LLP

(57) ABSTRACT

A system and method for bit-exact lossless compression coding of still and moving images. An original image is encoded to produce a lossy compressed image, and is also used to construct a sorted list of bin values to which the lossy image is compared to generate output from which the original image can be losslessly reconstructed. The similarity of corresponding pixel values between the lossy image and the original image permits efficient generation of a lossless residual that allows for bit-exact reproduction of the original image. Pixel values nearly equidistant from two sorted list values are on a "cusp" and either directly coded or flagged as cusp values from which corresponding lossless values can be re-determined. Non-cusp pixel values are coded as the difference between the index of the sorted bin having a value nearest to the floating point value being processed, and the index of the sorted bin containing the exact pixel value of the original image.

43 Claims, 2 Drawing Sheets

EFFICIENT BIT-EXACT LOSSLESS IMAGE CODING RESIDUAL SYSTEM

RELATED APPLICATIONS

This application claims priority to U.S. provisional patent application Ser. No. 60/758,490, filed Jan. 12, 2006.

BACKGROUND OF THE INVENTION

1. Field of the Invention

This invention relates to bit-exact lossless compression coding of still and moving images.

2. Description of Related Art

The JPEG-2000 standard (see JPEG2000, *Image Compression Fundamentals, Standards, and Practice* by David S. Taubman and Michael W. Marcellin, Kluwer Academic Publishers 2002) supports intra-frame (still image or stand-alone moving image) coding. Within JPEG-2000 are two Discrete Wavelet Transforms, DWT 9/7 and DWT 5/3. The 9/7 and 5/3 numbers indicate the number of coefficients in the "bi-orthogonal" sub-band "analysis" and "synthesis" filter kernels of the transforms. The DWT 9/7 transform is used by JPEG-2000 in a "lossy" coding system, where the image bits are not exactly reproduced, but where compression of 10:1 can be achieved with good quality using quantization. The DWT 5/3 system is used by JPEG-2000 in a lossless bit-exact coding system, without quantization, with limited compression efficiency, usually about 2.3:1.

JPEG-2000 does not provide a method of combining the information in the DWT 9/7 transform lossy coding system with the lossless DWT 5/3 transform coding methods. A further limitation of the JPEG-2000 compression system is that it is only designed to code integer pixel values.

In the U.S. patent application entitled "High Precision Encoding and Decoding of Video Images" (Ser. No. 09/798,346, co-invented by the present inventor), an integer exact match is described wherein the result of decoding within an image compression encoder exactly matches the result of decoding within a compressed image decoder. The decoder thus produces exactly the same integer result as produced during encoding. The present inventor utilized this exact match to create a difference residual to the source integer pixel values to create a lossless layered coding system. This work was presented to the MPEG committee in Sydney Australia in July 2001. However, coding efficiency was not as high as JPEG-2000's lossless mode. For example, the integer residual and exact match layered coder achieved about 1.9:1 compression ratio on test images, whereas JPEG-2000's lossless mode achieved about 2.2:1 compression on the same images.

In addition, "High Precision Encoding and Decoding of Video Images" described the use of regional integer scale factors in order to extend integer dynamic range on a regional basis (although all values must be clipped to values above zero). However, there are inherent limitations in the use of integer pixel values for extended dynamic range in images. Further, extended dynamic range was not explored in the context of a lossless coded residual (the July 2001 tests mentioned above had integer values with black at 0 and peak white at 1023).

The OpenExr file format (an open extended range file format developed by Industrial Light & Magic for use in computer imaging applications; see www.openexr.com) supports a "half" precision 16-bit floating point format for pixel values which has extended brightness above peak white (above 1.0) and an extended range of dark value precision, as well as supporting negative numbers. Built into the OpenExr file readers and writers is a "PIZ" compressor, which uses a Haar difference wavelet for pixel pairs (average and difference), followed by Huffman coding. The PIZ compressor gains efficiency if many of the 65,536 possible 16-bit codes are unused, which is often the case. This efficiency gain is achieved by creating an index of codes actually used, and coding the indices (using Haar and Huffman coding) rather than outputting the actual codes. If all of the codes are used, Haar and Huffman coding will usually gain about a 30% bit reduction. If an image using a 10-bit integer pixel value range is converted to at most 1024 16-bit OpenExr values, then the PIZ compression method's index table will usually help achieve compression of about 2:1 (and sometimes a little mbre).

Unlike JPEG-2000, the U.S. patent application entitled "High Quality Wide Range Multi-Layer Image Compression Coding System" (application Ser. No. 11/225,665, filed Sep. 12, 2005, claiming priority to Ser. No. 60/609,773, filed Sep. 14, 2004, by the present inventor) can utilize ubiquitous floating point values at high precision (e.g., 32-bit floating point) at all points except for quantization to or de-quantization from integers. The use of floating point values during encoding and decoding computations provides for substantially higher precision coding of pixel values than typical integer image coding systems (although very large integers could also be used, but existing implementations preserve integer precision to at most 16-bits). Further, floating point processing allows very wide dynamic range of brightness (both very bright and very dark), as well as coding of negative values.

Unlike JPEG-2000, the "High Quality Wide Range Multi-Layer Image Compression Coding System" patent application can provide a strict error bounding (which is optionally a function of brightness and/or color) which can be applied at one or more layers. Also, an optimal filter can be used at one or more layers to bound errors. That application also describes methods to characterize still and moving images to assist in compression processing. For example, the noise floor at each brightness and color can be determined in order to set quantization to a level below such noise floor.

BRIEF SUMMARY OF THE INVENTION

In accordance with one embodiment of the invention, an original image is encoded in a lossy process to produce a compressed image. The present invention uses the original image and the lossy compressed image to generate output from which the original image can be losslessly reconstructed. If the lossy image is a high precision floating point representation, then the pixel values of the lossy image will usually be near to the original pixel values (for typical high-quality quantization parameters). The present invention takes advantage of the high similarity of corresponding pixel values between the lossy image and the original image to efficiently generate a lossless residual that allows for bit-exact reproduction of the original image.

In one embodiment, a lossy compressed image comprising high precision wide-dynamic range floating point values corresponding to the pixel values of the original image can be generated (decoded) during the encoding of such original image. The floating point pixel values are then compared to a sorted list of pixel values for the original image to find the closest sorted list value (or "bin"). Each entry row in the list comprises an index number (or bin number) column and a color value column. The sorted list of pixel values may include all colors, or may consist of sub-lists of values separated by color.

If a floating point value is nearly equidistant (determined utilizing a specified cusp threshold range) from two sorted list values, that floating point value can be declared as being on a "cusp". Typically only a small portion of the pixels being processed will be on a cusp. In one embodiment, if the floating point value is on a cusp, the bin index corresponding to the pixel value of the original image is output directly (this is known as direct coding).

As an alternative, or in addition, to determine cusps solely in the encoder, a further method can be employed. If the encoder determines that a pixel value is on (or near) a cusp, it can signal this with an appropriate method, as with direct coding described above. However, rather than using direct coding, all that must be conveyed to the decoder is a flag value indicating that the pixel is a cusp value and whether the lossy decoded floating point pixel value should be rounded up or rounded down in order to uniquely and unambiguously associate such value with a bin number. The stand-alone decoder can then round up or round down each such pixel value flagged as being on the cusp, and associate that value with a unique bin number.

Another approach is for the stand-alone decoder to determine if a particular lossy decoded floating point pixel value from the lossy image is on a cusp by examining the distance of such value from the adjacent floating point values in the bins above and below during decoding (the same process is also used in the encoder). If the floating point pixel value is nearly equidistant, the stand-alone decoder can indicate the pixel as being on the "cusp". The decoder then examines a flag bit from the encoder in order to know whether to go up or down to associate the pixel value with the appropriate nearest bin. It will often be the case that a single bit, indicating whether to go up or down, together with a means of flagging encoder-determined cusp pixels (and thus the presence of an up-down bit) will be more efficient than sending directly coded bin numbers to the decoder.

Once a floating point pixel value from the lossy image is determined not to be on a cusp, a coded output can be generated that is the difference (delta) between (1) the index of the sorted bin having a value nearest to the floating point value being processed, and (2) the index of the sorted bin containing the exact pixel value of the original image. Importantly, if a low quantization value is used for lossy coding, the difference will often be zero, which codes very efficiently. A complete set of lossless residual encoding values can be stored or conveyed as a layer in a multilayer image format.

In the illustrated embodiment, to decode the output of the invention for a particular image, an end-use decoder must be provided with three things: (1) the sorted list of values for that image (or group of images in some cases, as described in greater detail below), (2) the compressed but lossy data required to reconstruct the image, and (3) a list of the output bin indices (for cusp pixels) and bin index deltas (formatted as a lossless residual layer in the preferred embodiment). A pixel having a directly coded index value is losslessly converted to the original color value by looking up the associated value in the sorted list. A pixel coded as a delta value can be reconstructed by looking up the bin index in the sorted list that is associated with the color value from the received lossy image, then applying the delta value to reference the bin containing the true color value to be assigned to the pixel. The result will be a bit exact, lossless reconstruction of the original image.

The invention may be used regardless of whether the source image uses integer pixels or floating point pixels. The lossless bit-exact coding method of the present invention is effective independent of the number of integer or floating point bits used for image coding. Utilizing this method, a higher compression ratio can be achieved using the combination of lossy image coding and lossless "residual" bin index coding than other lossless image compression methods (including the OpenExr "PIZ" and JPEG2000 DWT 5/3 lossless methods). Bit-exact lossless coding in accordance with the invention includes a lossy coding layer at a high compression ratio, with a lossless residual layer, thus providing additional functionality and flexibility. The exact lossless layered coding of the present invention efficiently supports both integer and floating point pixels of any practical precision (e.g., 8 to 16 bits integer or floating point). Further, the present invention is efficient independent of whether image pixels have a gamma or are linear, and independent of whether negative numbers are coded in the pixels, and independent of whether a wide dynamic range is used in the pixel values.

The details of one or more implementations of the invention are set forth in the accompanying drawings and the description below.

DETAILED DESCRIPTION OF THE INVENTION

Overview

Figure 1:
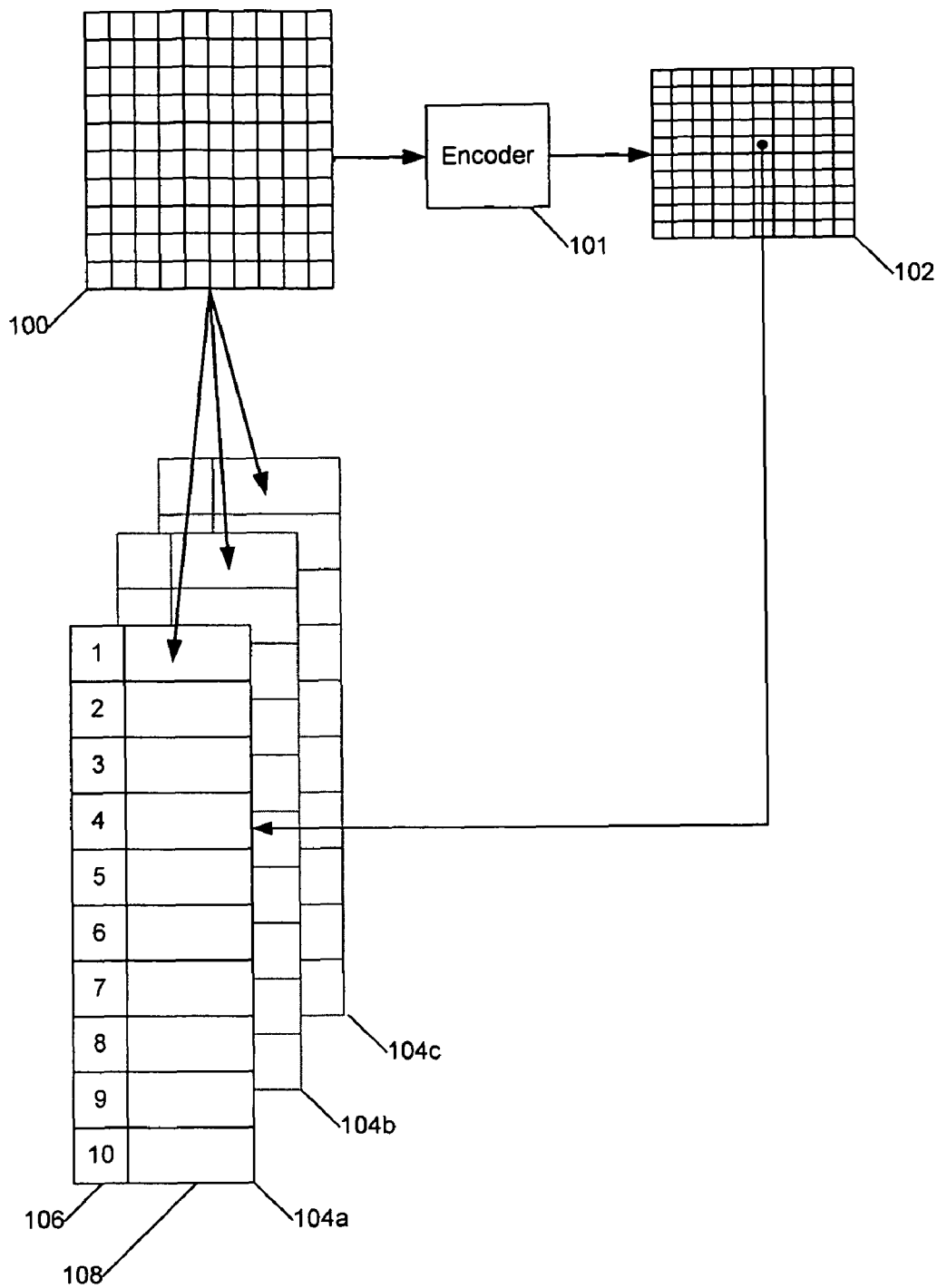
FIG. 1 is a block diagram of a lossless image compression system in accordance with the present invention.

FIG. 1 is a block diagram of a lossless image compression system in accordance with the present invention. In accordance with one embodiment of the invention, an original image 100 is encoded in a lossy process 101 to produce a compressed image 102. One such process 101 is described in "High Quality Wide Range Multi-Layer Image Compression Coding System" by the present inventor (it should be understood that an encoder in accordance with this type of system includes a decoder subsystem; such an encoder-based decoder is distinct from an end-use (stand-alone) decoder that decodes an encoded bitstream provided by data transmission or from a media). The present invention uses the original image 100 and the lossy compressed image 102 to generate output from which the original image 100 can be losslessly reconstructed. If the lossy image 102 is a high precision floating point (e.g., 32-bit floating point) representation, then the pixel values of the lossy image 102 will usually be near to the original pixel values (for typical high-quality quantization parameters). The present invention takes advantage of the high similarity of corresponding pixel values between the lossy image 102 and the original image 100 to efficiently generate a lossless residual that allows for bit-exact reproduction of the original image 100.

More particularly, in the illustrated embodiment, a lossy compressed image 102 comprising high precision wide-dynamic range floating point values corresponding to the pixel values of the original image 100 can be generated (decoded) during the encoding of such original image. The floating point pixel values are then compared to a sorted list 104a-104c of pixel values for the original image 100 to find the closest sorted list value (or "bin"). Each entry row in the list 104 comprises an index number (or bin number) column 106 (generally integer values) and a color value column 108 (either integer or floating point values). As described in greater detail below, the sorted list of pixel values may include all colors, or may consist of sub-lists of values separated by color (as shown in FIG. 1).

If a floating point value is nearly equidistant (determined utilizing a specified cusp threshold range) from two sorted list values, that floating point value can be declared as being on a "cusp". Typically only a small portion of the pixels being processed will be on a cusp. In one embodiment, if the floating point value is on a cusp, the bin index corresponding to the pixel value of the original image 100 is output directly (this is known as direct coding). Thus, the number of the desired bin itself, together with a means of flagging this direct coding, replace the small fraction of pixels in an image which are found to be on the cusp. Typically less than 0.02% of all pixels (one in 5000) will fall on a cusp with 32-bit floating point computation. With 64-bit floating point decoding, the number of cusp instances will be significantly smaller (i.e., less likely).

Thus, for example, if the $46^{th}$ floating point value of the lossy image 102 being processed is determined to be on a cusp, then the color value corresponding to the $46^{th}$ pixel in the original image 100 is compared to the color value column 108 to look up the bin number in the index number column 106 that is associated with that color value. That bin number is then output as the coded value for the pixel being processed.

As an alternative, or in addition, to determining cusps solely in the encoder, a further method can be employed. If the encoder determines that a pixel value is on (or near) a cusp, it can signal this with an appropriate method, as with direct coding described above. However, rather than using direct coding, all that must be conveyed to the decoder is a flag value (e.g., 2 bits) indicating that the pixel is a cusp value and whether the lossy decoded floating point pixel value should be rounded up or rounded down in order to uniquely and unambiguously associate such value with a bin number. The stand-alone decoder can then round up or round down each such pixel value flagged as being on the cusp, and associate that value with a unique bin number.

Another approach is for the stand-alone decoder to determine if a particular lossy decoded floating point pixel value from the lossy image 102 is on a cusp by examining the distance of such value from the adjacent floating point values in the bins above and below during decoding (the same process is also used in the encoder, as described in greater detail below). If the floating point pixel value is nearly equidistant, the stand-alone decoder can indicate the pixel as being on the "cusp" (without reference to cusp flags from the encoder). In order to then determine whether to go up or down to the correct bin number, the decoder then needs to examine a flag bit from the encoder (which must be present for all possible cusp pixels as determined by the encoder's decoder) in order to know whether to go up or down to associate the pixel value with the appropriate nearest bin. It will often be the case that a single bit, indicating whether to go up or down, together with a means of flagging encoder-determined cusp pixels (and thus the presence of an up-down bit) will be more efficient that sending directly coded bin numbers to the decoder. Given that it will use less bits to go toward the lossless bin, the choice of up or down is optimal in the lossless bin direction. The key is not which direction the value goes (up or down) since either is unambiguous, but rather the flagging of a given pixel (for this color primary) as being on a cusp.

Once a floating point pixel value from the lossy image 102 is determined not to be on a cusp, a coded output can be generated that is the difference (delta) between (1) the index of the sorted bin having a value nearest to the floating point value being processed, and (2) the index of the sorted bin containing the exact pixel value of the original image 100. Importantly, if a low quantization value is used for lossy coding, the difference will often be zero, which codes very efficiently. Thus, for example, if a floating point value from the lossy image 102 has a value that is closest to a sorted bin (say, bin #7) containing "0.1003" and the corresponding pixel of the original image 100 has a value that is assigned to another bin (say, bin #5), then the coded output will be the delta between the bin indices, or −2. A complete set of lossless residual encoding values, suitably coded for bit efficiency, can be stored or conveyed as a layer in a multilayer image format.

In the illustrated embodiment, to decode the output of the invention for a particular image, an end-use decoder must be provided with three things: (1) the sorted list 104a-104c of values for that image (or group of images in some cases, as described in greater detail below), (2) the compressed but lossy data required to reconstruct image 102, and (3) a list of the output bin indices (for cusp pixels) and bin index deltas (formatted as a lossless residual layer in the preferred embodiment). A pixel having a directly coded index value is losslessly converted to the original color value by looking up the associated value in the sorted list. A pixel coded as a delta value can be reconstructed by looking up the bin index in the sorted list 104a-104c that is associated with the color value from the received lossy image 102, then applying the delta value to reference the bin containing the true color value to be assigned to the pixel. The result will be a bit exact, lossless reconstruction of the original image 100.

Use of a cusp threshold range helps offset variations in floating point processing due to compiler variations in the order of additions, subtractions, and multiplications, which can result in very slight discrepancies between a decoded floating point value generated during decoding versus the corresponding decoded floating point value generated during encoding. The cusp threshold eliminates most or all of the errors which would result from these minor differences in decoded floating point values. As an alternate or augmenting method to the use of this cusp concept, if an independent decoding pass is applied (e.g., by using one or more variations on the order of computations or the processor type), then floating point pixel values from two or more independent passes can be examined to empirically discover any pixels which do not exactly match, again directly coding any non-matching pixels. Another method to handle the cusp is to decode using one or more variations on the order of computations or the processor type, and empirically discover any pixels which do not exactly identically associate. Such pixels can then be "patched" for direct coding. Such separate decoding allows the use of a smaller cusp threshold, since such statistical outliers resulting in mismatches should be rare, whereas larger cusp thresholds can begin to include many more pixels in direct coding, thus reducing coding compression efficiency.

Note that the cusp mis-association error manifests as an adjacent bin value (either one above or one below) during generation of a lossless residual. Since there are only a small portion of values on the cusp, and even a smaller number which will actually mis-associate, the number of pixels which are not bit exact, and the amount of the error, will both be very small. In some cases, such "near" exactness may be acceptable. However, the use of direct coding with an adequate cusp threshold ensures than it will be statistically extremely unlikely that any pixel mis-associates, and thus that all pixels in all frames are bit-exact.

The invention may be used regardless of whether the source image 100 uses integer pixels or floating point pixels. The lossless bit-exact coding method of the present invention is effective independent of the number of integer or floating point bits used for image coding. Utilizing this method, a higher compression ratio can be achieved using the combination of lossy image coding and lossless "residual" bin index coding than other lossless image compression methods (including the OpenExr "PIZ" and JPEG2000 DWT 5/3 lossless methods). Bit-exact lossless coding in accordance with the invention includes a lossy coding layer at a high compression ratio, with a lossless residual layer, thus providing additional functionality and flexibility. The exact lossless layered coding of the present invention efficiently supports both integer and floating point pixels of any practical precision (e.g., 8 to 16 bits integer or floating). Further, the present invention is efficient independent of whether image pixels have a gamma or are linear, and independent of whether negative numbers are coded in the pixels, and independent of whether a wide dynamic range is used in the pixel values.

Generation of Lossy Image from Original Image

Utilizing a compression system such as the ubiquitous floating point precision processing described in the "High Quality Wide Range Multi-Layer Image Compression Coding System" patent application by the present inventor, a high precision wide-dynamic range lossy floating point value can be generated (decoded) for each pixel of an original image 100 during an encoding (compression) process to create a lossy image 100. In that invention, a lossy image compression system is described which can utilize wavelets, optimal filters, or a combination, to band-split an original image into lower resolution subimages having a floating point representation. These subimages can then be quantized using floating point quantization parameters which can be regionally sensitive to brightness and color using low resolution bands to drive quantization. Further, error can be bounded by using SNR (signal to noise reduction) layers which are driven by coded error (with higher error regions being given more correction data). Error can also be bounded for specific colors and/or brightnesses by "targeting" SNR layer's data to be concentrated at these colors and/or brightnesses. In this way, a lossy floating point result is generated from the original image, typically with high precision and high compression.

The high precision of the floating point (e.g., 32-bit floating point) lossy image 102 generally means that the pixel values of the lossy image 102 will usually be near to the original pixel values (for typical high-quality quantization parameters). The lossy image 102 may be coded using an RGB color space, or by converting RGB to YUV (also known as YPrPb), or by using any other desired color space. If an alternate color space, such as YUV, is more efficient for lossy coding (that is, RGB values are converted to YUV values for coding), the resulting YUV coded values can be converted back to RGB (or any other useful original color space or number of primaries) floating point values before using them to generate a lossless residual in accordance with the invention (note that a corresponding conversion of YUV encoded values to RGB has to be performed at the end-use decoder). Note that reduced resolution for R-Y and B-Y (the U and V of YUV) channels, horizontally, vertically, or both, does not hinder the effectiveness of the present invention, although full resolution for all channels appears to usually be optimal (both for lossy and lossless coding).

It will usually be desirable to optimize the efficiency of the lossy coding first, and then to apply the lossless residual coding method of the current invention. It will generally be the case that the overall compression can be improved if the lossy coding process is optimized to minimize the total lossless value. However, the quality and compression ratio for lossy coding may then be lower or higher than is most useful. An a priori knowledge of whether the efficiency and quality of the lossy image 102 is more important than the total lossless compression ratio (or whether they are equally useful) can be used to help adjust this balance. The optimization of the lossy coding by itself is a good starting point, since the lossless residual of the current invention will not be much less efficient than the optimal combined level (although it will in general be somewhat less efficient). The lossy coding system 101 described in the "High Quality Wide Range Multi-Layer Image Compression Coding System" patent application (application Ser. No. 11/225,665, filed Sep. 12, 2005, claiming priority to Ser. No. 60/609,773, filed Sep. 14, 2004, by the present inventor) can be decoded at numerous resolutions and SNR layers, independent of the presence of a lossless residual layer. It should be noted that the lossless residual layer will usually be applied after the highest quality SNR layer (if SNR layers are present), although it can be applied after any full resolution lossy decoded result. It will normally be the case that every SNR layer will improve the compression of the lossless residual layer, although the total compression efficiency will usually decrease slightly. If one or more SNR layers are present (targeted or not), they should usually be optimized for their use in lossy high compression coding, and allow the lossless residual to be applied after the highest SNR layer present. The result of lossy decoding will be a floating point result, whether or not there are SNR layers present.

Sorted Pixel Value List(s)

Figure 2:
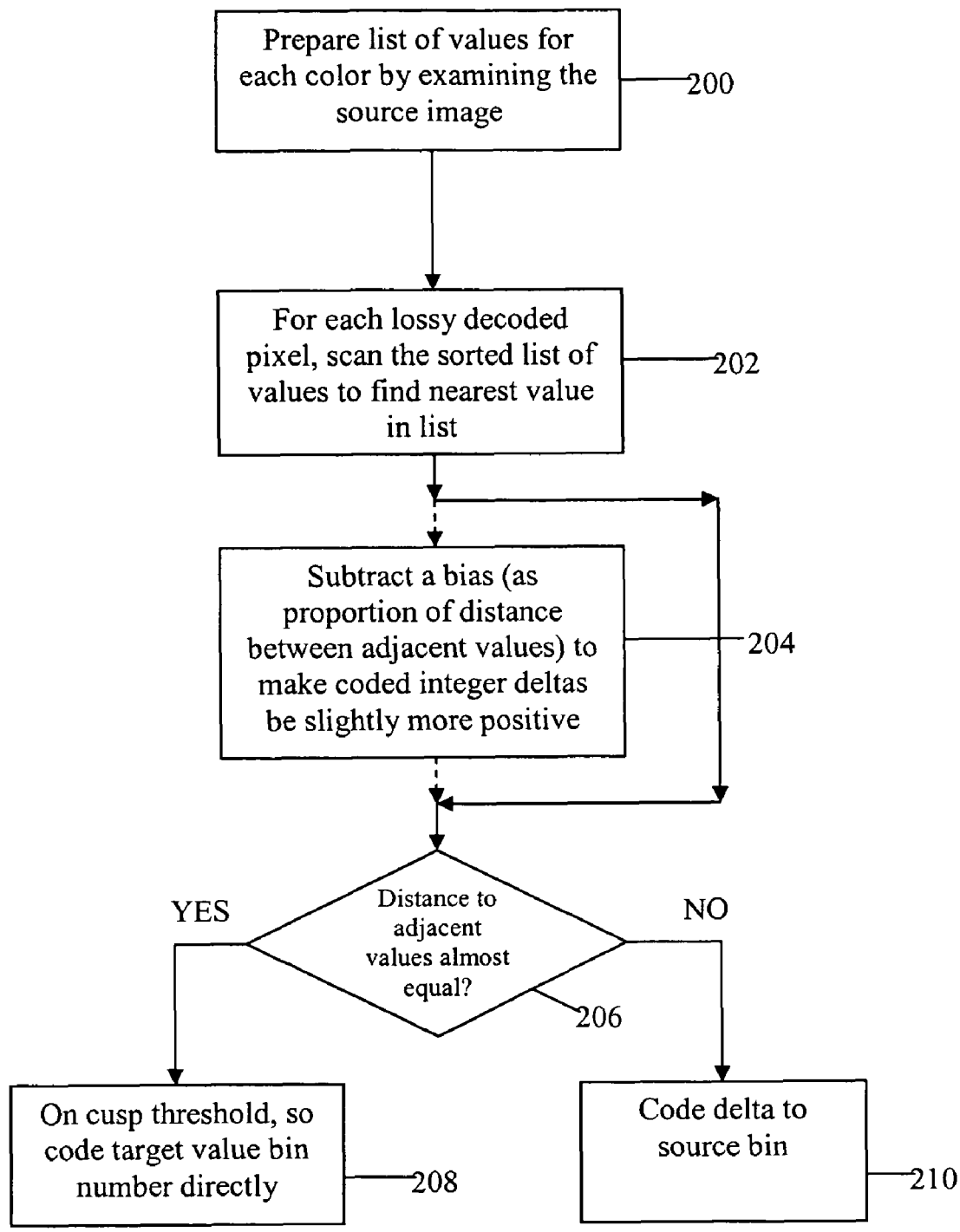
FIG. 2 is a flow chart illustrating a basic flow of one embodiment of the present invention.

FIG. 2 is a flow chart showing the basic process flow of one embodiment of the invention. As a first step, the pixels in the original image 100 being coded are examined, and the values are sorted into at least one list 104a-104c (STEP 200). A single list can be used for red, green, and blue values, or separate sub-lists can be used, one for each of red 104a, green 104b, and blue 104c color values (as shown in FIG. 1). If more than three primaries are coded, then corresponding lists can be made for every primary. An alternative approach is useful if nearly all code values are used in every image frame. In such a case, the sorted list of code values may be sent for a group of frames. In general, the size of the sorted list of values is usually small compared to the total compressed image data for each image frame, so it is most often optimal to send the list for every color primary for every image frame.

Building the sorted lists 104a-104c may be accomplished in any convenient way. In one method, the sub-lists 104a-104c are initially empty. For each color primary (typically red, green, and blue, but may be any color primary set), every pixel of the original image 100 is tested against all of the values already in the corresponding sub-list 104a-104c. Each sub-list is kept sorted during this comparison, for convenience (this also allows a binary comparison algorithm to be applied, improving efficiency over a linear comparison algorithm). If a pixel's primary color value is already present in the corresponding sub-list 104a-104c, then no action is needed. If the corresponding sub-list 104a-104c does not contain the value of the current pixel, then that value is sorted/merged into the appropriate sub-list. After this process has been applied to every pixel in the original image 100, the sub-lists 104a-104c for each color primary will contain every value that is used in any pixel in that image.

The sorted list(s) can store integers or floating point values, and there is no limitation on the length of the list(s) (the number of values which are used in the original image 100), nor is there any limitation on the number of bits stored in each value. Thus, a single methodology for providing value bins for lossless coding is applicable to a wide variety of precisions of both integer and floating point values.

The sorted list(s) 104a-104c must be conveyed to a decoder, and may be so conveyed as part of a compressed bitstream or bitfiles. The "High Quality Wide Range Multi- Layer Image Compression Coding System" patent application describes the use of folders and files for each such aspect of compressed image data, as well as the process of multiplexing these aspects into a running image bitstream. Note that the sorted list of values may be compressed using any appropriate lossless method, for example using the well-known "gzip" algorithm. Further, the sorted list of values may be stored as files in an appropriate folder, or it may be multiplexed into a lossless coded bitstream.

While the use of a list of actual values and the indexes to their sorted bins is used by OpenExr, the present invention applies this concept to a lossless difference residual. Further, the present invention extends this idea to residuals which reproduce arbitrary precision integers as well as pixels of arbitrary floating point precision.

Comparison of Lossy Pixel Values to Sorted List Values

Once the lossy image 102 is created and the sorted lists 104a-104c are generated, the constituent floating point pixel values of the lossy image 102 can be compared to the sorted list 104a-104c of pixel input values to find the closest sorted bin value (STEP 202). In general, such a floating point pixel value will be near to a single value in the sorted list of values. However, it is possible that a floating point pixel value will be nearly equidistant between two sorted list values, making it difficult to know which list value to associate with the lossy pixel value.

If a lossy floating point pixel value is nearly equidistant from two adjacent sorted list values (STEP 206), the floating point pixel value can be declared as being on a "cusp", utilizing a specified cusp threshold range (the size of the ambiguity region). Floating point pixel values determined to be on a cusp can be coded directly (STEP 208). A small portion of such pixels will typically be on the cusp.

If a lossy floating point pixel value is not on a cusp (which is usually the case), then its value is can be unambiguously matched to a particular sorted bin for both the decoder portion of the encoder, and the standalone decoder. Once a lossy floating point pixel value is determined not to be on a cusp, a coded output (typically an integer value) can be generated that is the difference (delta) between (1) the index of the sorted bin having a value nearest to the floating point pixel value being processed, and (2) the index of the sorted bin containing the exact pixel value of the original image 100 (STEP 210). As noted above, if a low quantization value is used in the lossy-portion of lossless coding to create the lossy image 102, the difference in bin number will often be zero. If the delta value is not zero, then the value will usually be a small signed integer. These small integers can be coded in a variety of ways for bit efficiency; one such way uses the region-size-adaptive and variable-length-coding adaptive integer coding methods described in the "High Quality Wide Range Multi-Layer Image Compression Coding System" patent application.

As an optional step, a bias can be subtracted from each lossy floating point pixel value before associating it with a sorted value bin (or a cusp between bins) (STEP 204). The bias can be a proportion of the distance between the nearest adjacent bins (above and below). Subtracting this bias will tend to bring small negative integer bin delta values up to zero, which codes more efficiently than the sign bit of a negative integer. The same optional bias adjustment (if used) must be applied when associating lossy floating point pixel values with bins during decoding. Any repeatable mapping can be used between the lossy floating point values and the bins (indexes) of the sorted list of values, although it is usually desirable to minimize coded bits for the resulting lossless integer delta values (the deltas to the correct exact value bin number).

Associating Lossy Floating Point Pixel Values with Bins

Once the lossy floating-point pixel values have been decoded to form the lossy image 102, they may be compared against the sorted list of values (the "bins" containing all used values from the original image 100). In general, a floating-point lossy decoded pixel value will fall between two adjacent bins in the sorted list. However, if a floating-point pixel value exactly equals a bin value, then it is assigned the corresponding bin number. If a pixel value is below the lowest bin value, it is assigned to the bin number of that lowest bin value, [and if a pixel value is above the highest bin value, it is assigned to the bin number of that highest bin value. [If a pixel value is between two bin values, which is most likely, then the higher bin value minus the lossy decoded floating pixel value is subtracted from the lossy decoded floating pixel value minus the lower bin value. The absolute value of this difference is divided by the absolute value of the pixel value itself, and is then compared with a cusp-threshold value. If the floating point lossy pixel value is approximately half way between the bin value above and the bin value below, then this pixel value (of this color primary) is flagged as being on the cusp. This is easily determined since the difference of the bin value above minus the floating point lossy pixel value will be nearly the same as the floating point lossy pixel value minus the bin value below. Thus, the absolute value of their difference, divided by the absolute-value of the pixel value itself, will be small, and can be compared with a cusp-threshold value. For 32-bit floating-point lossy decoding, the cusp-threshold-value will typically be in the range 0.000001 to 0.0005.

The cusp threshold is a function of the number of bits of floating-point precision, and is not affected by the floating point value of reference white or use of negative values. As just mentioned, a 32-bit floating point embodiment in accordance with this invention would typically use a cusp value threshold in the range of 0.000001 to 0.0005. For a 64-bit floating point embodiment, a cusp value threshold several orders of magnitude smaller could be used (e.g., 0.000000001). Further, when using floating-point compilers and computers which exactly reproduce the decoded floating-point values of the decoder within the encoder, a cusp-value threshold of 0.0 may be used, since the cusp is eliminated by the exactly-matching nature of the floating-point decoding computations. However, it will usually be best not to rely on exact floating-point decoding computational match, since current processors and compilers do not reproduce exactly matching results, but rather differ in small amounts due to low-order-bit differences in floating-point computations. This is true even though most computer processors and compilers state that they are compliant with "IEEE floating point" standards. For example, the floating point results from the PowerPC G5 using the gnu compiler do not exactly match the Intel P4 using the gnu compiler.

Note that integer pixel values, such as 10-bit values between 0 and 1023, are mapped into floating point values for the lossy and lossless coding. Integer pixel values function identically to floating-point pixel values due to this mapping.

Floating Point and Integer Pixel Value Exact Reproduction

As noted above, the invention may use a source image represented as integer pixel values or as floating point pixel values. A floating point scale factor (or other one-to-one uniform mapping) can be used to map integer values to floating point values, and its inverse can then be used to re-map the decoded lossy floating point values back to integers. For example, 10-bit integer coding can map the integer value 1023 to floating point 1.0, and the integer value 0 to floating point 0.0. Upon decoding, 1.0 maps back to the integer value of 1023, and 0.0 maps to integer 0. Of course, there are an infinite number of mappings possible between integers and floating point, but mappings which are more uniform (such as scaling) will usually be more efficient.

History Buffer

The use of adaptive region sizes for lossless coding is described in the "High Quality Wide Range Multi-Layer Image Compression Coding System" patent application. The lossy coding system described in that application requires a variable-length bit-wise encoding system after quantization, as do most other lossy image coding systems (such as JPEG-2000 and MPEG-2). Such variable-length bit-wise encoding systems are applied to integer values, and are bit-exact lossless. In that patent application, an adaptive region size is utilized to help match a variety of variable-length coding tables to the inherently varying statistics within an image, and within the various layers of the multi-layer image coding system. Using this adaptive region size approach, greater efficiency is achieved versus previous variable-length coding systems.

The present invention extends the adaptive region variable-length coding (ARVLC) methodology to include a history buffer. This history buffer stores recently encoded integer values (and also stores recent values during decoding) in sizes and image region shapes which prove to be optimal during encoding. Those recent values form a history buffer, such that the recent integer values may be subtracted from current integer values to be losslessly coded, to see if the result uses fewer bits. If the minimum bits are obtained by subtracting some of the data in the history buffer from current data, then a pointer to the particular recent history buffer integer values is included in the output (rather than completely re-coding the current integer values), with the resulting difference being coded by the most efficient (least total bits for that shape) variable length table.

The algorithm for use of such a history buffer may be summarized as follows: for a current region of integer values (the output of delta and cusp direct coding as described above), where the region has a particular size (e.g., x by y=n values):

(1) If the history buffer is empty, add the n values of the current region to the history buffer, and emit a code bit that indicates not to use the history buffer for this region of n values;
(2) If the history buffer is not empty, subtract each value of every similar shaped buffer entry (also having n values) from the corresponding values of the current region, and code the difference with an ARVLC coder;
(3) Determine if at least one coding of the current region relative to the history buffer (the flag bit meaning "use history buffer"+the index to the history buffer entry+the ARVLC coded bits for the region difference) is less than ARVLC coding of the original n values of the current region, and if so, emit this lesser sequence of bits as the coding for the current region (can optimize by looping through all of the history buffer to find the most compact coding);
(4) If no result of step (3) is less than ARVLC coding of the original n values, add the n values of the current region to the history buffer, and emit a code bit that indicates not to use a history buffer difference for this region of n values.

Although it is simplest to use a history buffer for each size and shape, alternate sizes and shapes can also be utilized when beneficial. For example, a 2-wide by 16-tall region can reference a 4-wide by 8-tall region in the history buffer, if the difference results in the minimum number of coded bits after variable-length-coding of the resulting difference.

The reason that this history buffer methodology is highly effective for both lossless and lossy image coding is that recent items in the history buffer are likely to have similar data statistics. Recent items come from similar layers, or from different colors in the same layer, as well as coming from different regions in the same color in the same layer. Thus, it will often be the case that a new region of integers to be losslessly coded will be similar to several recently coded regions of the same or similar size and shape. Upon testing against the available variable-length codes, each of which is optimized for different statistical distributions of integer values, the particular variable length code can be determined which results in the minimum amount of bits. This can be compared against the similar minimum number of bits without reference to the history buffer, to determine whether this particular region benefits from reference to the history buffer and corresponding difference with it. Note that an exact match is not required (although occasionally an exact match will occur, resulting in minimum bits since a region of zeros can be coded with a single bit). The most similar region in the history buffer will result in smaller values after taking the difference, thus resulting in fewer bits for the subsequent lossless variable-length coding step.

Sparse Lossless Retention and/or Conveyance

Although it would normally be the case that the present invention would be used to create a lossless residual for every frame, it may sometimes be useful to create, convey, or store only some frames. Thus, another aspect of the present invention is its use to create and/or convey and/or store only occasional lossless residuals layers. This can be done according to the methods described in the current invention, according to other methods using other lossless image coding systems, or even by sending occasional uncompressed frames. All methods of sending occasional exact lossless frames along with compressed moving images are a useful idea of the present invention.

For example, a lossless residual layer for one frame per second in a moving image sequence might be created, conveyed, or stored, whereas the lossy compressed image would be created, conveyed, and/or stored for every frame. This is useful in many applications where the exact nature of the noise and detail of a few representative frames helps to validate and augment the lossy compressed frames. As an alternative to the example of one lossless frame per second, there may be one frame per several seconds, one frame per scene, one frame per shot within a scene, or any other useful interval.

In this way, a high compression ratio is retained while maintaining the value of having representative lossless frames available. In addition to one frame for each second, shot, or scene, it may also be useful to send several representative lossless frames, or several adjacent lossless frames in order to establish frame-to-frame or frame-to-representative-frame noise, color, and detail statistics.

Another useful approach is to create and store lossless frames at a source, and convey lossless frames upon request. The recipient of conveyed compressed frames could thus request lossless frames, or sequences of lossless frames, which are of specific interest. There are many useful ways in which to apply the creation and/or storage and/or conveyance of only a portion of the lossless frames or lossless residuals.

While there are many ideas for how to characterize the noise, detail, color, and brightness of an original image, there is really no substitute for having one or more representative frames available. Further, it has proven difficult to ensure that such characterizations convey sufficient and appropriate information about the image frames. Each original frame thus embodies all of its own representational statistics, which can be analyzed after decoding of the lossless residual according to the present invention. Such analysis may include future methods for understanding image detail and noise which do not presently exist. Such future characterizations may yield methods of recreating this information in the lossy decoded frames near the losslessly decoded frame(s). An occasional lossless residual thus provides exact image frames which give an accurate archival indication of the original images, as well as an accurate source for analytical methods of understanding and characterizing the contents and characteristics of the images (including the adjacent lossy images).

Automatic Fixed Pattern Noise Removal

In the "High Quality Wide Range Multi-Layer Image Compression Coding System" patent application (application Ser. No. 11/225,665, filed Sep. 12, 2005, claiming priority to Ser. No. 60/609,773, filed Sep. 14, 2004, by the present inventor), there is description of the concept of removal of fixed pattern noise from source images. This includes area array sensors such as CMOS and CCD sensors in cameras, as well as line array scan sensors used for film scanning. Fixed pattern noise is a confound with respect to motion compensation. Further, fixed pattern noise must be reproduced by every frame, whether the frame is intra or motion compensated.

Another aspect of the present invention is the retention of an average of the floating point discrepancies between lossless decoding and the exact source image values. If the floating point value of the difference between the lossy floating decoded value and the lossless floating or mapped/scaled integer value is averaged every frame, it will tend asymptotically toward the fixed pattern noise. This is because the lossy codec, whether motion compensated or not, is designed to code image information, and is not optimized for coding fixed pattern noise. Although the difference between lossy decoding and the original image values will initially contain coding errors due to quantization, after a number of frames (several, dozens, hundreds, or even thousands), the average of the lossy decoding error will tend toward the fixed pattern noise. Thus, another aspect of this invention is the use of a weighting proportion of the running average of one or more frames subtracted from the difference between the lossy decoded floating point value and the original value (whether the original is scaled/mapped integer or floating). Typical weighting proportion factors are between 0.1 and 1.0 of this running average, depending mostly upon how many frames are in the average. As an example, an optimal weighting proportion factor over 100 frames might be 0.5 and after 10 frames might be 0.2.

Use of Residuals with Noise Reduction

It is common practice with distribution compression systems to apply some noise reduction before compression. In U.S. Pat. No. 6,442,203 B1 "System and Method for Motion Compensation and Frame Rate Conversion" by the present inventor, various useful noise reduction methods are described. Noise reduction can be used as a pre-processing step before image compression of still or moving images in order to improve compression efficiency. However, sometimes it is also desirable to have the original image data. The original data may be needed for precision analysis, for production processing, for mastering and/or for archiving. Further, many noise reduction processing algorithms can remove details of interest from the scene. It is thus often useful (and sometimes necessary) to have access to the pre-noise-reduction image data.

Images which have been noise-reduced usually will be more efficient in lossless residual compression according to the present invention. Thus, another aspect of this invention is the application of bit-exact lossless residual coding to exactly reproduce the noise-reduced original image data. Optionally, as an alternative or in addition, a different lossless residual using the present invention can be generated which reproduces the original image data before noise reduction. In this way, the benefits of noise reduction prior to compression can be retained, while also having bit-exact lossless reproduction of the noise reduced image and/or the original image. Note that noise reduction processing should optimally have precise pixel-phase alignment (i.e., no pixel displacement) when using noise reduction in the manner being described here.

The concept of precisely coding a noise-reduced intermediate may be further usefully extended to include more than one level of noise reduction. A mild noise reduction algorithm is often applied in conjunction with stronger noise reduction algorithmic steps. Some noise reduction systems iteratively apply noise reduction steps, and sometimes apply them with ever-increasing strength. Therefore it also will be potentially useful to compress residuals to more than one level of noise reduction, such that the noise and detail of the original image is recreated in more than one step, using more than one lossless residual.

Further, lossy compression coding methods can be intermixed with lossless residual methods in order to optimize the usefulness of the coded structure.

Another aspect of the present invention is to consider the both the noise-reduced and the original image data for lossless coding using the bin structure described in the present invention. This combined consideration uses a structure where more than one lossless residual is used, with one or more noise-reduced intermediate images, and a final lossless original. For example, with one noise-reduced intermediate lossless residual layer, and one final lossless original residual layer, the first residual builds upon the lossy decoded image (according to the method described in the presented invention) to create the noise-reduced intermediate losslessly. A second residual (according to the method described in the present invention) then further corrects this noise-reduced intermediate to obtain the exact original.

When performing this combined consideration of noise-reduced and original image data, it is beneficial to utilize the same bins as the original image 100, since processing of a post-noise reduction image would usually yield additional and/or different bins. Thus, the results of noise reduction would be compared against the sorted bin list of the original image, and the noise-reduced lossy image pixel values would be assigned to the nearest bins. A further optimization is to recognize that the noise-reduced intermediate image is intended to be a step on the way to the exact original image. Because of the combined consideration of data, it is possible to know how many bins above or below the lossy bin the final lossless image will use. It is therefore usually beneficial to restrict the selection of bins for the noise-reduced residual such that the bins are always in the direction of the final lossless bin, or at least not in the opposite direction.

For example, if a lossy pixel value is determined to match bin 37, and the noise-reduced pixel value is determined to be between bin 33 and bin 34, but the lossless original pixel value is assigned bin 40, then the noise reduced intermediate should be assigned to bin 37, 38, 39, or 40. If assigned 37, then the lossy pixel value bin is used, minimizing coded bits for the noise-reduced intermediate residual. If assigned to bin 38 or 39, then the difference is being divided between the noise-reduced residual and the original lossless residual according to a user-specified amount during encoding. If assigned to bin 40, then the noise-reduced image pixel values are ignored if they do not tend in the direction of the original image bin numbers, and the original lossless image bin is used, again by user selection. Typical user selection will assign bin 37, the lossy decoded bin value, since this will minimize the data size of the noise-reduced lossless residual, which is often desirable.

As another example, if the lossy bin is again bin 37, the lossless original bin is again bin 40, but the noise-reduced bin is bin 43, then the noise-reduced bin would be reassigned to bin 40. Thus, in general, the intermediate noise-reduced residual bins are constrained to lie at or between the lossy decoded bin and the lossless original bin. In general, many or most of the noised-reduced bins will lie in between, providing a useful intermediate decoded image between the lossy decoded and the lossless original. In general the sum of bits required to implement the bin deltas of the noise-reduced residual plus the bits required to convey further deltas to the original bins will exceed the number of bits of a single residual from the lossy to the original. Thus, a multi-layered set of lossless noise-reduced intermediate residuals should be coded only when such intermediates are expected to be useful in decoding. Some high quality noise reduction methods, such as those described in the U.S. Pat. No. 6,442,203 B1 "System and Method for Motion Compensation and Frame Rate Conversion", can closely resemble the sharpness and detail of the original image, although noise is reduced. This is a desirable intermediate in many applications.

Further, noise reduction can be set at various levels, such that multiple noise-reduced intermediates are sometimes useful. In such case, residuals can be used to convey bin deltas to each noise-reduced intermediate, with every intermediate being constrained to fall on bins from the original, and to lie between the bins of the next lower layer and the original bin values.

For lossy decoded pixel values on the cusp, the final lossless original value is sent, and all noise-reduced intermediate(s) are ignored at that pixel and color, and assigned a bin delta of 0 (which codes with the least bits) for those pixel values on the lossy decoded cusp.

Thus, significant efficiency and functionality improvement is achieved by associating the noise-reduced pixel values with original image bins, and by restricting the bin deltas of a noise-reduced intermediate residual to the direction toward the original image bin value (or at least not in the opposite direction).

Optionally and additionally, it may sometimes be useful to reduce the number of bits associated with bins or bin deltas for use with the noise-reduced intermediate. The inherent image noise around a given bin value may be known for a color primary at the bin's brightness level of that primary. As an example, if it is known that a particular image frame contains noise averaging ±16 bins around bin 50, then bin deltas can be reduced by up to 4 bits without exceeding inherent image noise levels.

One way to achieve this is to shift the positive or negative bin delta right by 4 bits (in this example) before encoding the noise-reduced intermediate. The noise-reduced intermediate would then be shifted left by 4 bits (in this example) before being added to the final lossless residual. The sign of the bin delta may be conveyed in the noise-reduced intermediate, and need not be repeated in the final lossless residual.

Another way to take advantage of a high average noise level in the original image frame is to reduce the number of bins to a subset by collapsing nearby bin values into adjacent bins. The shorter bin list can then be used by the noise-reduced intermediate, resulting in smaller deltas and thus more compact coding.

Either of these methods, and other similar methods which can be devised, can provide intermediate noise-reduced residual images which retain much of the noise character of the original image, which further are between the lossy decoded image and the exact lossless image, but which are more compact that coding using the full precision of all the bins in the original image.

This optional additional reduction in bin delta, precision or the number of bins for the noise-reduced intermediate should be specified considering the inherent noise level of the original image frames. This can be done by a user specified parameter, or alternatively by an automated noise-level detection algorithm. When using the shortened bin list, the shorter bin list for the noise-reduced intermediate must be conveyed to the decoder, as with the full bin list for the lossless original image. However, this can be done with a single bit per bin simply by flagging which of the lossless original bins are to be used by the noise-reduced intermediate, and which bins are to be ignored. If using an algorithm for reducing the deltas of the noise-reduced intermediate, the parameters of that algorithm must be conveyed to the decoder. For example, if a shift amount is used, then this shift amount must be conveyed to the decoder.

If the noise level of the original image is known regionally within an image, then the precision of the noise-reduced intermediate can be correspondingly varied by region.

The general multi-level lossless methodology described in this section can be usefully applied to compression, storage, conveyance, or flexible decoding. The use of sparse lossless frames or residuals, as described above, can also benefit from applying bit-exact frame coding to original images as well as to images processed using one or more levels of noise reduction. The sparse lossless coding of selected frames can further usefully have some frames with full lossless original precision, other frames with a noise-reduced intermediate, and yet other frames without such an intermediate.

Use of Bin Deltas with Lower Resolution Layers

The layered lossless system described here, including the use of bins, can be applied at one or more reduced resolution levels, such as the 2k-wide and/or 1k-wide level of a 4k-wide image (or the 512-wide and/or 1k-wide level of a 2k-wide image). Note that reference here to a 4k-wide image implies a 4096 horizontal resolution, and a vertical resolution relationship (such as 1714, 2048, or 3072 tall) is implicit. Note that there is no actual concept for a "lossless" 2k-wide original, when the actual original image comprises a 4k-wide image. With a defined good quality downsizing filter (such as a windowed sinc filter), any 2k-wide filtered version could be considered as a form of original for a 4k-wide image, and could be adapted as described here, including the use of multiple layers. However, use of a normal downsizing filter (such as a windowed sinc filter) will yield an "original" image that generates a huge increase in the number of bins with respect to the actual original image. Thus, there is a choice about how many bins to use if bin-referenced delta coding is used on a reduced resolution image, such 2k-wide and/or 1k-wide images derived from a 4k-wide image. If the bins in the original 4k-wide image (or original 2k-wide image, if the source image is 2k-wide) are reasonably uniform, they can be used at the 2k-wide (and/or 1k-wide) level. Also, as will be discussed below, some bins can be added to the original bins, when needed. Note that it is also possible to build resolution enhancing layers, such as 2k-wide up to 4k-wide, 1k-wide up to 2k-wide, or even 1280-wide by 720-tall up to 1920-wide by 1080-tall, entirely from integer bin deltas, without further use of floating point representations.

When using bin deltas at a level below the final full resolution (4k-wide in this example), every 4k-wide layer could take advantage of the bin intermediate layers, beginning with the first 4k-wide layer. At present, however, the first 4k-wide layer is preferably built upon floating-point 2k-wide and 1k-wide layer elements, and not on the integer-delta bin system. In practice, any layer or set of layers can be built upon any point in the previous layers. Optimal use of bits, however, suggests that all layers be built upon the highest available lower layers. However, it may sometimes be useful to base "branches of the tree" in both SNR and resolution layers which come to a common point in the hierarchy, but which otherwise form independent "branches".

The use of integer bin deltas is probably best managed without a return to a floating point representation, although a return to floating point is also potentially useful. Note that each return to floating point, including even simple matrix transformations (such as YUV to/from RGB) requires an additional cusp-detection. The detected cusp pixels, however, need only be signaled once after the final floating point step, in any useful subsequent bin-delta layer (although it is usually most convenient to use the final lossless bin-delta residual). If a floating point pixel value to associated bin cusp is detected for a given pixel at any layer, that pixel is on a cusp for all subsequent layers. A pixel need not be declared on a cusp for lower layers, although there is no concept of an "bit-exact original" for any layer below the final original at full resolution, which is the primary use of cusp determination (to ensure bit-exact decoding by ensuring an exact bin reference).

Adding Bins

The degree that a high quality noise reduction pre-processor is able to analytically distinguish signal from noise is limited in the current state of the art. However, it is likely that this analysis will improve in the future as technology and algorithms improve. The degree of improvement to anticipate is unknown, although it is reasonable to expect some improvement.

An analysis of image noise is possible, which can then be used for noise reduction processing. Under optimal conditions, with the current state of the art, it is possible that the noise reduction system can understand enough about the originally created source image (as it might have existed prior to over-quantized post production steps) to actually yield some degree of repair to post-production quantization damage. A common loss due to insufficient bit-precision quantization is visible contour-banding. Such banding can be mitigated somewhat (in some very localized cases) by precision noise-reduction algorithms. If a high precision is used for noise reduction processing, such as 32-floating-point as, it will sometimes be possible that the noise-reduced original will have aspects of actual improvement over the bit-exact original (although aspects of degradation are also likely).

A way to take advantage of these potential improvements is to examine the noise-reduced original with respect to the intermediate residual when using a bin subset. In the creation of a bin subset, the values within the bins can be examined to determine the distance between values with respect to the noise floor. If the distance is larger than the expected noise floor (for a given brightness and color), new bins can be added in between, having values usefully spaced within this gap. Thus, a useful bin subset might actually have added values (and thus be a superset for some bin ranges). These extra values can also be added to the original bin value list (as well as being created and sent separately), since all that is necessary to reconstruct the image is that every used original value be present. In this combined case, the addition of extra values may increase bin deltas, but will otherwise not affect the ability of the bin value list to reconstruct the bit-exact original image (since all original image bins are still present).

With additional bins and bin values also present, the noise reduced original image can be examined as before. If a noise-reduced pixel value falls between the lossy decoded nearest bin and the original bin, this new intermediate value (which does not exist in the original image) can be used for the bin delta, when appropriate. As before, if the noise-reduced original falls outside of the span between the lossy decoded nearest bin and the original bin, it can be constrained to this range. In addition to use the noise reduced original to guide placement of additional bins, it will also sometimes be useful to use a proportion of the distance from the lossy nearest bin to the original bin. It will also sometimes be useful to consider both a proportion of the distance, as well as a proportion of the influence of the noise-reduced original. If a proportion would land in between bins with values that are widely spaced away from the desired value, it would be desirable to add a bin in this location. Another approach is to add bins in all bin regions where values are sparse and widely separated. Once the intermediate(s) have been determined, the unreferenced values may be culled from the list (since they are unreferenced, and thus it was not necessary to add them). In this way, some of the potential improvements (without adding any degradations) to aspects of the original image from high quality noise reduction may be retained, as well as providing a means of stepping in measured proportions toward the original bin and its associated value.

The following table provides an example of a small portion of a bin subset where the original image uses an OpenExr 16-bit half-float representation. The subset column describes whether a bin is included in an intermediate layer's subset, or whether it is an added bin (for that and perhaps other layers), which was not present in the original. Bins from the original image are numbered as integers (starting at 0), and added bins from the noise reduced original image are numbered as "A" followed by the number of the added bin (starting also at 0):

| Bin | Subset | Value | Why Included or Not in Subset, or Why Added |
| --- | --- | --- | --- |
| 0 | Yes/1 | −.00038 | Useful for averaging black at 0.0 |
| 1 | Yes/1 | −.0002 | Useful for averaging black at 0.0 |
| 2 | Yes/1 | 0.0 | Useful for representing extreme black |
| 3 | No/0 | .000001 | Value below both noise floor and extreme black |
| 4 | No/0 | .0000024 | Value below both noise floor and extreme black |
| 5 | No/0 | .000013 | Value below both noise floor and extreme black |
| 6 | Yes/1 | .0001 | Useful as 10,000: 1 dynamic range floor |
| 7 | No/0 | .000101 | Below noise floor at this brightness level |
| 8 | Yes/1 | .0002 | Useful step |
| A0 | Only | .0003 | Useful step, not present in original |
| 9 | Yes/1 | .0004 | Useful step |
| 10 | No/0 | .00041 | Below noise floor at this brightness level |
| A1 | Only | .00055 | Useful step, not present in original |
| A2 | Only | .0007 | Useful step, not present in original |
| 11 | Yes/1 | .0009 | Useful step |
| 12 | Yes/1 | .0012 | Useful step |
| A3 | Only | .0014 | Useful step, not present in original |
| 13 | Yes/1 | .0017 | Useful step |
| 14 | No/0 | .0018 | Below noise floor at this brightness level |

-continued

| Bin | Subset | Value | Why Included or Not in Subset, or Why Added |
|---|---|---|---|
| 15 | Yes/1 | .0019 | Useful step |
| ... | ... | ... | ... |
| 921 | Yes/1 | 0.994 | Useful step |
| 922 | Yes/1 | 1.0001 | Useful step (logical default white level at 1.0) |
| 923 | Yes/1 | 1.07 | Useful step (values above reference white preserved up to highest value present in original) |
| 924 | No/0 | 1.071 | Below noise floor at this brightness level |
| 925 | Yes/1 | 1.094 | Useful step |
| A134 | Only | 1.13 | Useful step, not present in original |
| 926 | Yes/1 | 1.18 | Useful step |
| 927 | Yes/1 | 1.213 | Useful step |
| 928 | No/0 | 1.217 | Below noise floor at this brightness level |
| 929 | Yes/1 | 1.241 | Useful step (highest value present in original) |

An example where the original image uses a 10-bit dpx printing density representation, with a noise floor at around 8 bits (2 least significant bits of noise) is as follows:

| Bin | Subset | Value | Why Included or Not in Subset, or Why Added |
|---|---|---|---|
| 0 | Yes/1 | 76 | Lowest value used in original (Dmin) |
| 1 | No/0 | 77 | Below noise floor at this density level |
| 2 | No/0 | 78 | Below noise floor at this density level |
| 3 | Yes/1 | 79 | Useful value slightly below noise floor |
| 4 | No/0 | 81 | Below noise floor at this density level |
| 5 | Yes/1 | 82 | Useful value slightly below noise floor |
| ... | ... | ... | ... |
| 517 | Yes/1 | 756 | Useful value slightly below noise floor |
| 518 | Yes/1 | 759 | Useful value slightly below noise floor |
| A0 | Only | 762 | Useful step, not present in original |
| 519 | Yes/1 | 764 | Useful value slightly below noise floor |
| 520 | Yes/1 | 768 | Useful value at noise floor |
| 521 | No/0 | 769 | Below noise floor at this density level |
| 522 | No/0 | 770 | Below noise floor at this density level |
| 523 | Yes/1 | 771 | Useful value at noise floor |
| A1 | Only | 775 | Useful step, not present in original |
| A2 | Only | 779 | Useful step, not present in original |
| A3 | Only | 783 | Useful step, not present in original |
| 523 | Yes/1 | 786 | Useful value |
| 524 | Yes/1 | 790 | Useful value at noise floor |
| 525 | Yes/1 | 793 | Useful value (highest value in original, Dmax) |

Adjustment Range

A lossy codec is used as the starting point for the lossless residual and residual mediates described in the present invention. All lossy codecs use a quantization step. because the quantization value can be adjusted (to some precision), it is possible to adjust the number of bits (and/or bitrate) applied to quantized aspects of the image. However, it is most optimal if the quantization levels are set primarily by image characteristics (such as noise floor). This inherently results in a variable amount of data per frame (and/or variable bitrate).

If many SNR layers are present, as with the lossy codec being used here, the use of each SNR layer can be viewed as a coarse form of bit amount (and/or bitrate) adjustment. For example, even though seven SNR layers may be created by the encoder, the transmission system (and subsequent decoder) may only use five of the layers at a given time, and three of the layers at another given time, and all seven layers at another given time. The presence or absence of the noise-reduced intermediate layer and lossless layer can be similarly utilized.

When present, the lossless final layer, however, cannot be adjusted in any useful way, since its size is exclusively a function of the noise levels in the original image and the quality of the lossy layers below it. It is the final remainder, and there is no adjustment possible to this final step.

The noise reduced intermediates, however, are amenable to adjustment, and even to realtime rate control, over a useful range. The characteristics of such adjustment, beyond presence or absence of a given layer, are subtle. As described above, shifting provides coarse adjustment, and bin subsetting provides fine adjustment within a useful range.

A significant issue arises around zero, however. If the first noise-reduced intermediate layer contains the sign (and direction toward the original) of the bin deltas, all subsequent layers need only have a bin delta magnitude. If bin-subsetting or shifting is used, values in the first intermediate which fall between 0 and −1 must be considered specially. If the first intermediate layer always carries the sign, then one bit may be needed for each color primary for each pixel. This will limit the amount of adjustment available, even in the presence of extreme shifting or extremely sparse bin subsetting. A single bit (the sign) for each color for each pixel, when variable-length coded, with the noise-like properties inherent in this layer, is likely to use 1 bit, or even more, per pixel (some cases may be able to use run-length codings or other mechanisms to reduce below 1-bit, but these generally will be the rare cases where unusual post-production or unusual creation processes or unusual codec settings have been used).

If the source image is a 12-bit representation, then a maximum of approximately 12:1 compression is available for this layer in most cases (less than 12:1 including the lossy layers). However, it is not necessary to carry the sign bit in the first layer when this problem is understood. As the shift becomes larger, or as the bin subsetting becomes more sparse, more and more of the lossy decoded floating point pixel values will associate with the desired subset (or shifted bin), yielding a delta coding of 0. This is greatly assisted when using lossy coding parameters intended to ensure that coding errors are strictly bounded below the noise floor. Similar noise floor guidance can be used to set the intermediate layer. For layering or adjustment purposes (such as bitrate control), the intermediate layer can be set more coarsely or more finely than the noise floor. If the adjustment criteria is based upon setting a bitrate/bitsize target, the relationship to the noise floor will, in general, not be consistent. The remaining intermediate layers (if present) and the final lossless bin delta layer can provide the strict relationship to the noise floor.

If the sign bit for values of 0, where subsequent layers have negative values, is moved to one of the next higher layers (usually the very next), then arbitrarily high compression ratios can be achieved in the noise-reduced intermediate layer(s). The presence of 0 can be used signal the presence of the sign bit in the next layer. Of course, values −1, and more negative, already signal negative numbers, and values 1, and above, already signal positive numbers. The value 0 becomes the uniquely-handled code if the sign bit is moved out of the first (or any subsequent) intermediate layers. Thus, full bitrate/bitsize control range can be achieved for all intermediate layers, as needed for a wide variety of applications, on every layer below the final (unadjustable) lossless bin delta layer. It many cases, a useful portion (such as half) of the lossless residual can be allocated to the noise-reduction-driven intermediate layer by retaining the sign for all pixels (including those that would otherwise map to 0). All other layers are then entirely magnitude values (in the direction of the sign from the first noise-reduced layer). Note that bitsize can be adjusted per frame, per scene, or even per region within a frame, as with rate-control methods. The bitsize/bitrate can then be adjusted finely, as with other rate control methods. This can be implemented as multiple sorted lists (having different fine control of values) per frame, or by selecting a portion of the subset selection bits to add or remove. In the case of shifting, the amount of shift can be increased and decreased as needed. Even whether the sign bit for 0 is sent in the first layer, plus optional additional noise-reduced intermediates, can be selected for rate control (thus being moved in an out of the first and possibly subsequent noise-reduction-driven intermediate layers).

Note that another method of coarse adjustment is available by not coding, storing, and/or sending all color primaries. For example, red, green, and blue might all be coded, but only green sent sometimes, and other times only green and red.

Further, it might sometimes be useful to use a luminance bin list for the noise-reduced intermediate. A corresponding coarser/sparser bin list or shift can also optionally be used for R-Y and B-Y (U and V) or for X and Z in an XYZ representation. As with red, and blue being sent and/or stored only sometimes (green being sent always in this example), U and V and/or X and Z can also be sent and/or stored only sometimes (Y corresponds approximately to green). Note that 32-bit precision considerations must be applied with respect to cusp determinations at the point where floating point pixel values are associated with the final original color primaries and associated bin lists (e.g., RGB, YUV, XYZ) if these primaries differ from the intermediate primaries and associated bin list(s). Even a simple color space matrix transform (e.g., YUV to RGB) can have the cusp variation in low order bits. Cusps are not necessary (but can be used optionally, if desired) for intermediates. Cusp determinations are only essential for the final bit-exact lossless residual, so the final association step must be designed to detect cusps, and must take into account any color space transformations that might be used in the intermediate (thus potentially widening the required cusp threshold). The intermediate bin deltas and the final lossless bin deltas may only be combined if the cusps of both color space associations are signaled, since misassociations can occur at both steps. Thus, a cusp is declared when any floating point pixel value (e.g., YUV and/or RGB) falls on a cusp on their respective bin lists.

Wide Range Integer to Floating Point Mapping Methodologies

As mentioned in the background description, OpenExr uses a sorted value list because the 16-bit floating-point values will often be a transformation of 10-bit codes. Thus, 1024 values will be occupied in the value list table, even though the entries in the table are 16-bit wide-ranged floating point. One can apply this same strategy to gain benefit from the present invention's lossless residual. For example, 10-bit DPX or Cineon data can be transformed via simple mappings to 1024 floating point values using a 16-bit OpenExr "half float" representation. These 1024 source image pixel values will occupy at most (if all values and brightnesses are used) 1024 values in the lossless residual table of the present invention. This is true of any red-to-red, green-to-green, blue-to-blue one dimensional lookup table method. These 10-bits represent the wide dynamic range of film, although the "DMIN" value should be removed since film negative minimum density contains no image information (it is an artifact of the manufacturing and film developing process).

Similarly, the 10-bit values produced by the Thomson Viper camera represent a wide range image which can be mapped to linear light values. If such a mapping is applied to create OpenExr 16-bit "half-float" data, together with scale factors for red, green, and blue, as a one-dimensional transformation, then at most 1024 values of 16-bit half float will be used. Such one-dimensional lookup processes benefit the present invention's methodology for lossless residual coding since the number of code values used is reduced (which may differ for red, green, and blue).

Such benefits are removed if FIR resizing filters or 3-D cross-color lookup tables are applied to an image, since such processing usually will fill many more 16-bit half-float codes in OpenExr or in Tiff16, or other more-than-10-bit representations.

Gamma, Linear, and Negative

In the "High Quality Wide Range Multi-Layer Image Compression Coding System" patent application, there is a description of direct coding of gamma-adjusted values as well as linear OpenExr (and other floating point) values. Many codecs required the "black lifting" inherent in exponent-gamma integer pixel source images. For example, a typical Hi-Definition or Standard-Definition video will use a gamma of 0.4 to 0.45 as an exponent to "lift" the dark and mid-grey values to higher integers, which are similarly reduced by the inverses of these exponents upon display. However, the "High Quality Wide Range Multi-Layer Image Compression Coding System" can code gamma-adjusted and linear (such as linear OpenExr) values directly. In a similar vein, the lossless residual of the present invention can be applied to efficiently create residuals for both gamma-adjusted and linear representations. Further, the lossless residuals of the present invention can be directly used with negative values. Thus, the efficiency of the methods in the "High Quality Wide Range Multi-Layer Image Compression Coding System" patent application is directly extrapolated to coding lossless residuals by the present invention.

Programmed Embodiments

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (which may include volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

Floating point lossy decoding with exact residual

Use of bins for source image values, both integer and floating, and conveying those values and bins to the decoder (applied to the lossy/lossless residual, unlike OpenExr PIZ coding).

Optionally compressing the bin data

Separate bin/value lists for r, g, and b residuals

Optional use of subtracting fractional-bin-distance bias (since pos and zero code better than slightly neg)

Use of cusp width at inflection point between bins (32-bit to 16-bit or to bin number integer size) having a defined cusp width. This defends against compiler variations in emitted code between decoder and encoder (order of adds, multiplies, subtracts, etc).

Cusp width wider if no chance to check decoding

Cusp narrower if chance to decode and check with patches for any discrepancies in bin number vs original YUV or RGB (or other) for lossy and RGB for residual Usually high precision floating point for lossy decoding, but integer will also work May need scale (such as mapping 1.0 in floating point to 1023 in 10-bit integer).

Every N frames lossless (compressed or uncompressed), in order to convey image patina and statistics, as well as to verify any losses are sufficiently low in lossy coder. Also, other useful intervals of sparse lossless frame creation, conveyance, and/or storage. Also, lossless residuals or frames by request based upon interest in specific frames or groups of frames.

Use of one or more lossless residuals before and/or after noise reduction.

Constraining noise-reduced intermediate lossless residuals to bins from the original image. Further constraining these bin values to lie on or between the lossy decoded bin value and the lossless original bin value. Further optionally reducing the number of bin delta values for the noise-reduced intermediate based upon either a user-specified parameter or based upon an analysis of the noise in the image.

Taking into account image noise levels when coding the precision of noise-reduced intermediates. Further taking into account regional noise levels within each image.

Accumulation of floating point one-or-more-frame average error in lossy coding vs original (source of lossless residual, without the bins). This will tend toward fixed-pattern errors. Use of a weighting in subtracting this average (typically between 0.1 and 1.0, e.g., 0.5).

Use of adaptive region size and shape for lossless residual bin delta coding

Use of adaptive VLC coding tables (optionally tested at various sizes and shapes) for lossless residual bin delta coding Use of an integer history buffer to subtract from data to be coded using the adaptive region size and shape when such subtraction results in fewer coded bits.

Application of the adaptive region history buffer for the lossless integer coding step of both lossless and lossy image coding.

Benefits of mapping 10-bit integer sources to 16-bit (and other) floating values to limit number of bins needed for lossless residual coding Application of this invention to gamma and linear and negative pixel values Use of bin delta methodology for SNR improvement on reduced resolution layers, in addition to the final full-resolution layers Use of bin delta methodology for resolution increasing layers, in addition to the final full-resolution SNR layers Adding bins and associated values to the bin/value list from the original image, in order to provide intermediate values, when-and-if gaps in the values present in the original image exceed some useful criterion (like the noise floor)

Use of such additional bins for the noise-reduction-driven intermediate

Bitrate/bitsize adjustment to meet any bitsize constraint, using the amount of shift or by adjusting the sparseness of bin subsetting. Bitsize can be adjusted per frame, per group of frames, per scene, or per region within a frame.

Application of bitrate/bitsize adjustment to one or more noise-reduced intermediate layers Placement of the sign bit in the first noise-reduced intermediate in order allow all subsequent layers to be coded as magnitude. Optionally moving this bit out of the first noise reduced layer into a subsequent layer, including the final lossless layer when the value in the first (and other lower) layers is 0.

Selection of which color channels to send (e.g. eliminate red, and/or blue while sending green) as a coarse bitsize adjustment.

Use of alternate color space for the noise reduced intermediate (such as YUV for the intermediate when the original is RGB). Consideration of the combined cusps in both the alternate-color-space intermediate and the original color space.

What is claimed is:

1. A method to provide bit-exact lossless compression of an original image comprising a number of pixels each having a value, the method comprising:

preparing a sorted list of pixel values by examination of pixels in the original image, each of the values in the sorted list of pixel values being located in a corresponding bin, each bin being represented by an integer index value;

encoding and then decoding the original image using a lossy process to produce a decompressed image, the decompressed image including a number of pixels each having a value;

comparing each pixel value from the decompressed image to the sorted list of pixel values to determine a nearest bin for each pixel;

determining a bin delta between the index value of the nearest bin determined for each pixel in the decompressed image and the index value of the bin identified for the corresponding pixel in the original image;

outputting the bin delta for each pixel; and outputting the sorted list of pixel values.

2. The method of claim 1, wherein the pixel values in the bins are floating point values.

3. The method of claim 1, wherein the pixel values in the bins are integer values.

4. The method of claim 1, wherein the pixel values of the original image include values representing multiple color channels, the method further including:

generating a plurality of sorted lists, each of the plurality of sorted lists corresponding to one color channel; and performing the method steps with respect to the values representing each color channel.

5. The method of claim 4, further including selecting less than all color channels for any image or layer when performing the method steps or during subsequent storage, transmission, or decoding of the output.

6. The method of claim 1, wherein the lossy encoding and decoding process results in the pixels having integer values.

7. The method of claim 1, further including subtracting a bias value from the values for each of the pixels in the decompressed image before comparison of the values in order to make the determined bin deltas more positive.

8. The method of claim 1, wherein the lossy encoding and decoding process results in the pixels having floating point values.

9. The method of claim 8, wherein if the floating point value for a pixel of the decompressed image is nearly equidistant from values stored in two adjacent bins in the sorted list of pixel values, the index value of the pixel in the original image that corresponds to the pixel in the decompressed image is output directly.

10. The method of claim 8, wherein if the floating point value for a pixel of the decompressed image is nearly equidistant from the value stored in two adjacent bins in the sorted list of pixel values, outputting a flag indicating that the pixel is on a cusp and that the nearest bin should be determined by rounding up to one of the two adjacent bins having the higher floating point value.

11. The method of claim 8, wherein if the floating point value for a pixel of the decompressed image is nearly equidistant from the value stored in two adjacent bins in the sorted list of pixel values, outputting a flag indicating that the pixel is on a cusp and that the nearest bin value should be determined by rounding down to one of the two adjacent bins having the lower floating point value.

12. The method of claim 8, wherein if the floating point value for a pixel of the decompressed image is nearly equidistant from the value stored in two adjacent bins in the sorted list of pixel values, outputting a flag indicating that the pixel is on a cusp and outputting a flag to identify whether to go up or down to associate the pixel value with the appropriate nearest bin.

13. The method of claim 9, 10, 11, or 12, wherein nearly equidistant is a defined cusp width to accommodate compiler variations in emitted code and floating-point processor variations between a decoder implementing the method and an encoder implementing the method.

14. The method of claim 13 wherein the cusp width is set based upon the degree of decoding accuracy which can be determined at the time of performing the encoding step of the method.

15. The method of claim 1, wherein the values for the pixels in the original image represent colors from a first color space, further including the steps of:
converting the first color space values to values in a second color space before the step of lossy encoding and decoding; and
converting the output of the lossy encoding and decoding step from second color space values to values in the first color space before the step of comparing to the values within the bins.

16. The method of claim 1, wherein the values for the pixels in the original image represent RGB values, further including the steps of:
converting the RGB values to YUV values before the step of lossy encoding and decoding; and
converting the YUV values for the decompressed image to RGB values before the step of comparing to the values within the bins.

17. The method of claim 1, wherein the pixel values in all steps represent colors represented in the same color space.

18. The method of claim 1, wherein the pixel values in the bins are integer values, and the lossy encoding and decoding process results in the pixels having floating point values.

19. The method of claim 1, wherein the set of bin deltas corresponding to the pixels of a decompressed image comprise a lossless residual image, and further including the steps of:
applying a plurality of variable length coding tables to a plurality of selected regions within each lossless residual image; and
selecting a subset of variable length coding tables and corresponding regions that generate fewer coding bits than at least one other subset of variable length coding tables and corresponding regions.

20. A method to provide bit-exact lossless compression of at least some of a plurality of original images, each comprising a number of pixels each having a value, the method comprising:
preparing at least one sorted list of pixel values for one or more selected images of a plurality of original images by examination of pixels in each selected original image, each of the values in each sorted list of pixel values being located in a corresponding bin represented by an integer index value;
encoding and then decoding the plurality of images using a lossy process to create a plurality of corresponding decompressed images, each pixel in the plurality of decompressed images having a value;
comparing each pixel value from each image of the plurality of decompressed images corresponding to a selected original image to at least one sorted list of pixel values for the corresponding selected original image to select a nearest bin value;
determining a bin delta between the index value of the nearest bin determined for each of the pixels in each selected decompressed image and the index value of the bin identified for the corresponding pixel in the corresponding selected original image; and
outputting the bin delta for each pixel;
outputting the sorted lists of pixel values; and
outputting at least the lossy decompressed images for which bin deltas were not output.

21. The method of claim 20, wherein the bin deltas and sorted lists of pixels values enable a decoder to losslessly reconstruct each corresponding selected original image, and to optionally derive information from such reconstructed original images relating to at least one of image patina, loss level for the lossy decompressed images, and image statistics.

22. The method of claim 20, further including transmitting the output to a decoder.

23. A method to provide compression of an original image comprising a number of pixels each having a value, the method comprising:
preparing a sorted list of pixel values by examination of pixels in the original image, each of the values in the sorted list of pixel values being located in a corresponding bin, each bin being represented by an integer index value;
generating at least one noise-reduced-driven intermediate layer from the original image, each intermediate noise-reduced-driven layer comprising a number of pixels each having a value;

encoding and then decoding the original image using a lossy process to produce a decompressed image, the decompressed image including a number of pixels each having a value;

comparing each pixel value from each intermediate noise-reduced-driven layer to the sorted list of pixel values to determine a noise-reduced-driven nearest bin value for such pixel;

comparing each pixel value from the decompressed image to the sorted list of pixel values to determine a lossy nearest bin value for such pixel;

limiting the noise-reduced-driven nearest bin value for each pixel in each intermediate noise-reduced-driven layer to be between the bin assigned for the pixel in the original image and the lossy nearest bin value;

generating an intermediate bin delta for each of the pixels in the decompressed image, the intermediate bin delta being the difference between the index value of the lossy nearest bin value determined for the pixel in the decompressed image and the index value of the noise-reduced-driven bin value determined for the corresponding pixel in at least one intermediate noise-reduced layer;

outputting the intermediate bin delta for each pixel; and outputting the sorted list of pixel values.

24. The method of claim 23, wherein any pixel on a cusp, as determined by the comparison of the pixels in the decompressed image or intermediate noise-reduced layer, is coded as having a bin delta of zero so that the pixel has the nearest bin value as assigned in the corresponding sorted list of pixel values.

25. The method of claim 23, further including the steps of shifting each intermediate bin delta right by a selected number of bits to reduce the number of bits when variable length coding the intermediate bin delta, and shifting each intermediate bin delta left by the same selected number of bits upon decoding.

26. The method of claim 23, further including the steps of dividing each intermediate bin delta by a value greater than one to reduce the number of bits when variable length coding the intermediate bin delta, and multiplying the intermediate bin delta by the same value upon decoding.

27. The method of claim 23, wherein a subset of the bins is used when the pixels of each noise-reduced-driven intermediate layer are compared to the sorted list of pixel values to determine an index value of the noise-reduced-driven nearest bin value, thereby reducing the number of bits when variable length coding the integer intermediate bin delta.

28. The method of claim 23, further including selectively adding values to a selected set of the sorted list of pixel values within the bins during comparison of the noise-reduced-driven intermediate images to yield a more uniform spacing of the values within such bins.

29. The method of claim 23, wherein each successive noise-reduced-driven intermediate layer moves at least some of the pixel values in such layer closer to the bin values representing the original image.

30. The method of claim 23, further including using rate-control to adjust the number of bits generated during encoding by adjusting the various parameters affecting the number of bits within each intermediate layer.

31. The method of claim 23, wherein the pixel values of the original image include values representing multiple color channels, the method further including:

generating a plurality of sorted lists, each of the plurality of sorted lists corresponding to a color channel of the original image; and performing the method steps with respect to the values representing each color channel.

32. The method of claim 31, further including selecting less than all color channels for any image or layer when performing the method steps or during subsequent storage, transmission, or decoding of the output.

33. The method of claim 1 or 23, further including coding the bin delta for each pixel using a plurality of variable length coding (VLC) tables and selecting a VLC table that generates fewer coding bits than at least one other VLC table.

34. The method of claim 23, wherein the set of intermediate bin deltas corresponding to the pixels of a decompressed image comprise a lossless residual image, and further including the steps of:

applying a plurality of variable length coding tables to a plurality of selected regions within each lossless residual image; and selecting a subset of variable length coding tables and corresponding regions that generate fewer coding bits than at least one other subset of variable length coding tables and corresponding regions.

35. The method of claim 23, wherein a sign bit is inserted in an initial intermediate bin delta to allow all subsequent layers to be coded as magnitude values.

36. The method of claim 23, further including generating a number of additional intermediate noise-reduced-driven layers, selecting nearest bin values for each of the pixels in each of the additional intermediate noise-reduced-driven layers, and determining bin deltas for each of the pixels in each of the additional intermediate noise-reduced layers, wherein a sign bit is located with the first non-zero-valued bin delta for the additional intermediate noise-reduced layers.

37. A method to provide compression of an original image comprising a number of pixels each having a value, the method comprising:

preparing a sorted list of pixel values by examination of pixels in the original image, each of the values in the sorted list of pixel values being located in a corresponding bin, each bin being represented by an integer index value;

encoding and then decoding the original image using a lossy process to produce a decompressed image, the decompressed image including a number of pixels each having a value;

comparing each pixel value from the decompressed image to the sorted list of pixel values to determine a nearest bin for each pixel;

generating at least one intermediate residual image as a set of bin delta values, each bin delta value being the delta between the index value of the nearest bin determined for each pixel in the decompressed image and the index value of the bin identified for the corresponding pixel in the original image;

transforming at least one of the intermediate residual images by a transformation process applying to such intermediate residual image;

outputting the intermediate residual images; and outputting the corresponding sorted list of pixel values for such intermediate residual images.

38. The method of claim 37, and the transformation comprises shifting each bin delta right value by a selected number of bits to reduce the number of bits when variable length coding the bin delta value, further including the step of shifting each such bin delta value left by the same selected number of bits upon decoding.

39. The method of claim 37, and the transformation comprises dividing each bin delta value by a selected value greater than one to reduce the number of bits when variable length coding the bin delta value, further including the step of multiplying the bin delta value by the same selected value upon decoding.

40. The method of claim 37, and the transformation comprises using a subset of the bins when generating one of the additional lossless residual images, thereby reducing the number of bits when variable length coding such additional lossless residual images.

41. The method of claim 37, wherein one intermediate residual image is comprised of bin deltas which yield a lossless bit-exact compression.

42. A method of decoding an original image from a lossless residual image, the lossless residual image comprising an array of bin deltas corresponding to pixels of an original, and from a sorted list of pixel values determined by examination of pixels in the original image, each of the values in the sorted list of pixel values being located in a corresponding bin, each bin being represented by an integer index value, the method comprising:

determining the integer index value in the sorted list associated with a pixel value of each pixel in a lossy decompressed image encoded and then decoded from the original image;

applying the bin delta value for each pixel in the lossy decompressed image to reference the bin containing an original color value assigned to the corresponding pixel in the original image; and outputting the original color value for each pixel to generate a bit-exact lossless reconstruction of the original image.

43. A method of decoding an image from a residual image, the residual image comprising an array of bin deltas corresponding to pixels of an original image, and from a sorted list of pixel values determined by examination of pixels in the original image, each of the values in the sorted list of pixel values being located in a corresponding bin, each bin being represented by an integer index value, the method comprising:

determining the integer index value in the sorted list associated with a pixel value of each pixel in a lossy decompressed image encoded and then decoded from the original image;

applying the bin delta value for each pixel in the lossy decompressed image to reference to the bin containing a color value, such color value representing an improvement in the quality of the lossy coding; and outputting the improved quality color value for each pixel to generate an improved reconstruction of the original image.

* * * * *